(12) United States Patent
Gallagher

(10) Patent No.: US 6,318,221 B1
(45) Date of Patent: Nov. 20, 2001

(54) APPARATUS AND METHOD FOR FORMING SEALING RINGS

(75) Inventor: Paul D. Gallagher, New Berlin, WI (US)

(73) Assignee: Hydra-Seal, Inc., Menomonee Falls, WI (US)

(*) Notice: Subject to any disclaimer, the term of this patent is extended or adjusted under 35 U.S.C. 154(b) by 0 days.

(21) Appl. No.: 09/542,411

(22) Filed: Apr. 4, 2000

(51) Int. Cl.[7] .................................................. B23B 1/00
(52) U.S. Cl. ........................... 82/1.11; 82/1.3; 82/113; 82/118; 29/417
(58) Field of Search ......................... 82/1.11, 113, 118, 82/120, 121, 46, 47, 55, 1.2, 1.3, 1.4, 11.4, 11.5; 29/417

(56) References Cited

U.S. PATENT DOCUMENTS

| | | | |
|---|---|---|---|
| 1,328,509 | * 1/1920 | Ganster | 29/417 |
| 1,935,494 | * 11/1933 | West | 604/218 |
| 3,857,156 | * 12/1974 | Clark | 29/417 |
| 4,126,064 | * 11/1978 | Tarrant | 82/1.11 |
| 4,450,614 | * 5/1984 | Repella | 29/417 |
| 4,542,573 | * 9/1985 | Bainard | 29/417 |
| 5,058,109 | 10/1991 | Nidehiko et al. . | |
| 5,313,694 | 5/1994 | Yonemoto et al. . | |
| 6,079,090 | * 6/2000 | Ongaro | 29/27 C |

* cited by examiner

Primary Examiner—Henry Tsai
(74) Attorney, Agent, or Firm—Andrus, Sceales, Starke & Sawall, LLP

(57) ABSTRACT

A process of manufacturing sinusoidal shaped sealing rings is provided in which the rings are machined from solid bars of material. The rings are machined from the outer diameter of the bar by means of OD turning, trepanning or face-grooving tool and a parting tool. All of the tools synchronously oscillate precisely with the spindle by means of computer control to form the sinusoidal shape. The remaining material is then salvaged and retained at a smaller diameter than it started. The smaller diameter bar is then used to make smaller diameter rings at a later date.

17 Claims, 5 Drawing Sheets

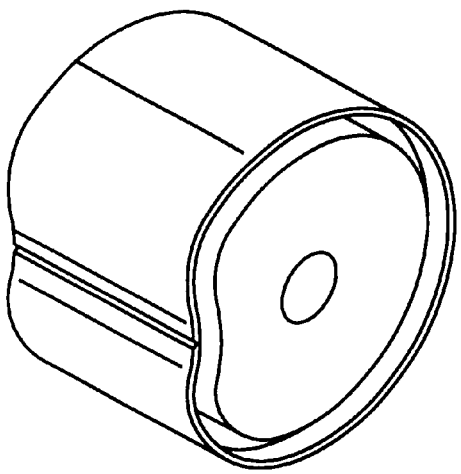
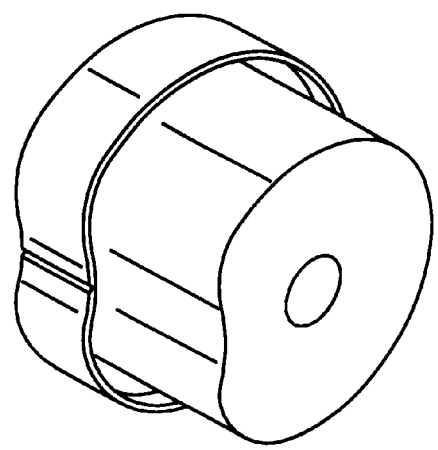
FIG. 5 　　　　　FIG. 6
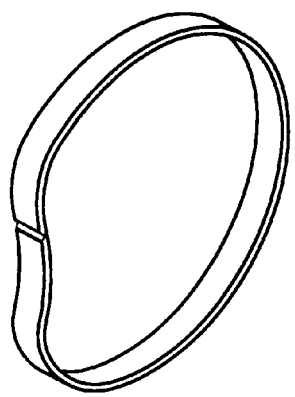
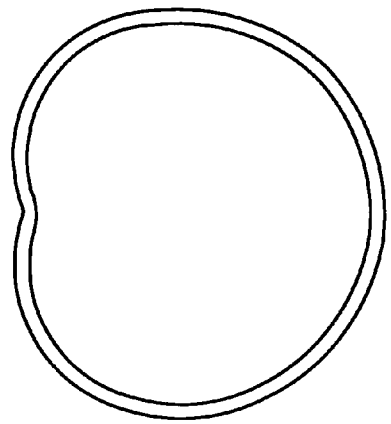
FIG. 7 　　　　　FIG. 8

APPARATUS AND METHOD FOR FORMING SEALING RINGS

FIELD OF THE INVENTION

This invention relates broadly to automatic machining equipment and, more particularly, pertains to an integrated machine tool for performing a series of processing steps in the manufacture of sealing rings.

BACKGROUND OF THE INVENTION

Sealing rings are not circular in the free, uninstalled state. They have a sinusoidal shape that must be obtained with non-standard means. The shape has been previously obtained with mechanical cams, heat shaping, and other more expensive and laborious methods.

Previously, sealing rings have been manufactured from individual castings that were cast slightly larger than the finished ring. Various methods were then used to bring the ring to its final shape. All of these methods use size-specific tooling and materials that are fairly expensive. The casting method also involves fairly lengthy setups on machinery, and also requires multiple machining operations for the outside diameter and the inside diameter. This process has been used for both large and small quantities of rings.

Another method widely used is the cold "tube process". This process involves a tube of material that is usually between three inches and twenty-four inches long. The tube is cast to outer diameter and inner diameter dimensions that have an amount of material that can be machined away to leave nearly finished dimensions for the completed rings. The tube is then parted or cut into individual rings. The individual rings must still have further machining done to them to achieve the final shape. This process is actually more expensive than the individual casting method previously described, but has the advantage of using readily available tubing, as opposed to having to tool a foundry for individual castings. Another disadvantage is that it is difficult to fixture or "chuck" a tube without deforming it, thus effecting the final shape. It is more suited for small quantities of rings.

A further process that has been documented is a modified version of the "tube process", as set forth in U.S. Pat. No. 5,085,109 issued Feb. 4, 1992. In this operation, the sealing rings are machined from tubing, but the machining is done in a non-circular method and machines the final ring shape immediately from the tube without requiring a secondary machining operation for the final outer diameter and inner diameter shape. The final contour is regulated by a computer control that has the correct cross-sectional shape of the ring programmed into it. This process has been further improved in U.S. Pat. No. 5,313,694 issued May 24, 1994.

Despite the attempts of the prior art, there remains a need to manufacture sealing rings in a manner which will utilize less expensive material, significantly reduced tooling and set-up costs, eliminate casting and tubing procedures, and possess the versatility to produce rings of various sizes.

SUMMARY OF THE INVENTION

The present invention advantageously provides an automated sealing ring forming process which operates upon solid bars of stock material to sequentially position the material to rough cut, finish turn, trepan and cuts off rings in an extremely efficient manner which makes optimal use of the stock material.

It is one object of the present invention to provide an improved, cost effective apparatus and method for forming sealing rings other than by a casting or tubing process.

It is another object of the present invention to provide a method of repetitively machining a solid core of material so as to produce progressively smaller diameter sealing rings.

It is an additional object of the present invention to provide a computerized numerical machine control (CNC) machine tool having reduced tooling costs and setup time required.

It is also an object of the present invention to provide a method for processing sealing rings which avoids the use of multiple jigs and measuring devices.

A further object of the present invention is to provide an automated machine tool having a multi-tool slider mechanism movable in synchronism with a rotating spindle carrying stock material to be transformed into a sealing ring.

In one aspect of the invention, a machine tool is provide for performing machining of a cylindrical workpiece having an outer periphery and a face connected for rotation at the end of a driven spindle structure having a slider arrangement for providing multiple tool engagement with the workpiece. A control system is also provided for coordinating movement of the spindle structure and the slider arrangement whereby the slider arrangement oscillates radially relative to the spindle. An improvement resides in a slider structure having a first oscillating tool for turning the outside diameter of the workpiece to a sinusoidal shape, and a second tool for plunging into the face of the workpiece to form a sinusoidal shaped cut at a depth substantially equal to the width of the sealing ring, and a third oscillating tool for plunging into the outer periphery of the workpiece to form a cut at a depth intersecting the cut of the second tool thereby forming a sinusoidal shaped sealing ring. The workpiece is a solid, cylindrical billet provided with a central hole formed therethrough. The spindle structure includes a hydraulic cylinder having an extendible and retractable rod provided with a threaded stud at one end thereof which passes through the hole in the billet and receives a nut thereon. The rod is selectively retracted to firmly retain the billet between the spindle structure and the nut for engagement with the first tool and the second tool. The billet may also be retained by a fixture or chuck.

In another aspect of the invention, a method is provided for machining a workpiece having an outer periphery and a face connected for rotation at the end of the driven spindle structure utilizing a slider arrangement for providing a multiple tool engagement with the workpiece and automatically coordinating the movement of the spindle structure and the slider arrangement. The improvement resides in the steps of (a) providing the workpiece in the form of a solid substantially cylindrical billet having retaining structure formed therein; (b) using at least one tool for rough cutting and finishing the outer periphery of the billet to a sinusoidal shape while the billet is attached to the spindle structure; (c) using another tool to form a sinusoidal shaped cut in the face of the billet at a depth substantially equal to the width of the sealing ring; and (d) using yet another tool to form a cut in the outer diameter of the billet at a depth intersecting the cut of the face cutting tool, thereby forming a sinusoidal shaped sealing ring. The method includes the step of removing the formed sealing ring from the billet. The method filer includes the steps of repeating (a) through (d) to remove the desired number of formed sealing rings from the billet. In addition, the method also includes the steps of (f) retaining the remaining billet and (g) retrieving the billet and repeating the steps (a) through (e) to form sing rings of a smaller outer periphery.

In yet another aspect of the invention, a machine tool is provided for forming sinusoidal shaped sealing rings form a solid, cylindrical billet having an outer diameter, a face and a hole formed centrally therein. The machine tool includes a spindle structure mounted for rotation about a first axial axis upon which the billet is removably attached. A slider arrangement is mounted for axial movement about a second axial axis parallel to the first axial axis and has a first portion and a second portion fixed adjacent thereto. The first portion is movably mounted along a radial axis generally perpendicular to the first and second axial axes and carries a parting tool and a finishing tool, and the second portion carries a turning tool and a trepan tool. A control device coordinates the movement of the spindle structure and the slider arrangement along the axial and radial axes such that, in sequence, the turning tool is engaged with the outer diameter of the billet to rough form a sinusoidal shape, the finishing tool is engaged with the outer diameter of the billet to finish the simnsoidal shape, the trepan tool is engaged with the face of the billet to form a sinusoidal cut at a depth substantially equal to a width of the sealing ring, and the parting tool is engaged with the outer diameter of the billet to form a cut at a depth intersecting the cut of the trepan tool, thereby forming a sinusoidal shaped sealing ring. The spindle structure includes an arbor connected thereto. A hydraulic cylinder has an extendible and retractable rod passing through the spindle structure, the arbor and the hole in the billet, and terminating in a stud on which a nut is threaded. The hydraulic cylinder rod is retractable to retain the billet between the arbor and the nut. The first portion is comprised of a quill selectively extendible and retractable between the slider arrangement and the billet.

Yet a further at of the invention relates to a method for manufacturing sinusoidal shaped sealing rings. The method includes the steps of (a) providing a solid, cylindrical billet having an outer diameter, a face and a hole centrally formed therein; (b) mounting spindle structure for rotation about a first axial axis, the spindle structure being provided with a movable rod having an end with a threaded stud; (c) removably fastening the billet on the stud such that the billet will rotate with the spindle structure; (d) mounting a slider arrangement for axial movement about a second axial axis substantially parallel to the first axial axis, the slider arrangement having a first portion, and a second portion fixed adjacent thereto, the first portion being movably mounted along a radial axis substantially perpendicular to the first and second axial axes and carrying a parting tool and a finishing tool, and a second portion carrying a turning tool and a trepan tool; and (e) automatically controlling the movement of the spindle structure and the slider arrangement along the axial and radial axes such that, in the following sequence, the turning tool is traversed across the outer diameter of the billet to form a sinusoidal shape, the finishing tool is traversed across the outer diameter of the billet to finish the sinusoidal shape, the trepan tool is plunged into the face of the billet to form a sinusoidal shaped cut at a depth substantially equal to a width of a sealing ring and the parting tool is plunged into the outer diameter of the billet to form a cut at a depth intersecting the cut of the trepan tool hereby forming a sinusoidal shaped sealing ring. The method includes the step of (f) removing the formed sealing ring from the billet, repeating steps (a) through (f) to remove the desired number of sealing rings from the outlet and (g) retaining the billet to inventory.

Various others features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 5 is a partial perspective view of a billet having its outside diameter rough cut and finished to a sinusoidal shape and formed with a face-grooving cut;

FIG. 6 is a view similar to FIG. 5 after several sealing rings have been removed, thus revealing a core to be retained for future use;

FIG. 7 is a perspective view of a finished sinusoidal shape sealing ring; and

FIG. 8 is a front view of the ring in FIG. 7.

DETAILED DESCRIPTION OF THE INVENTION

Figure 1:
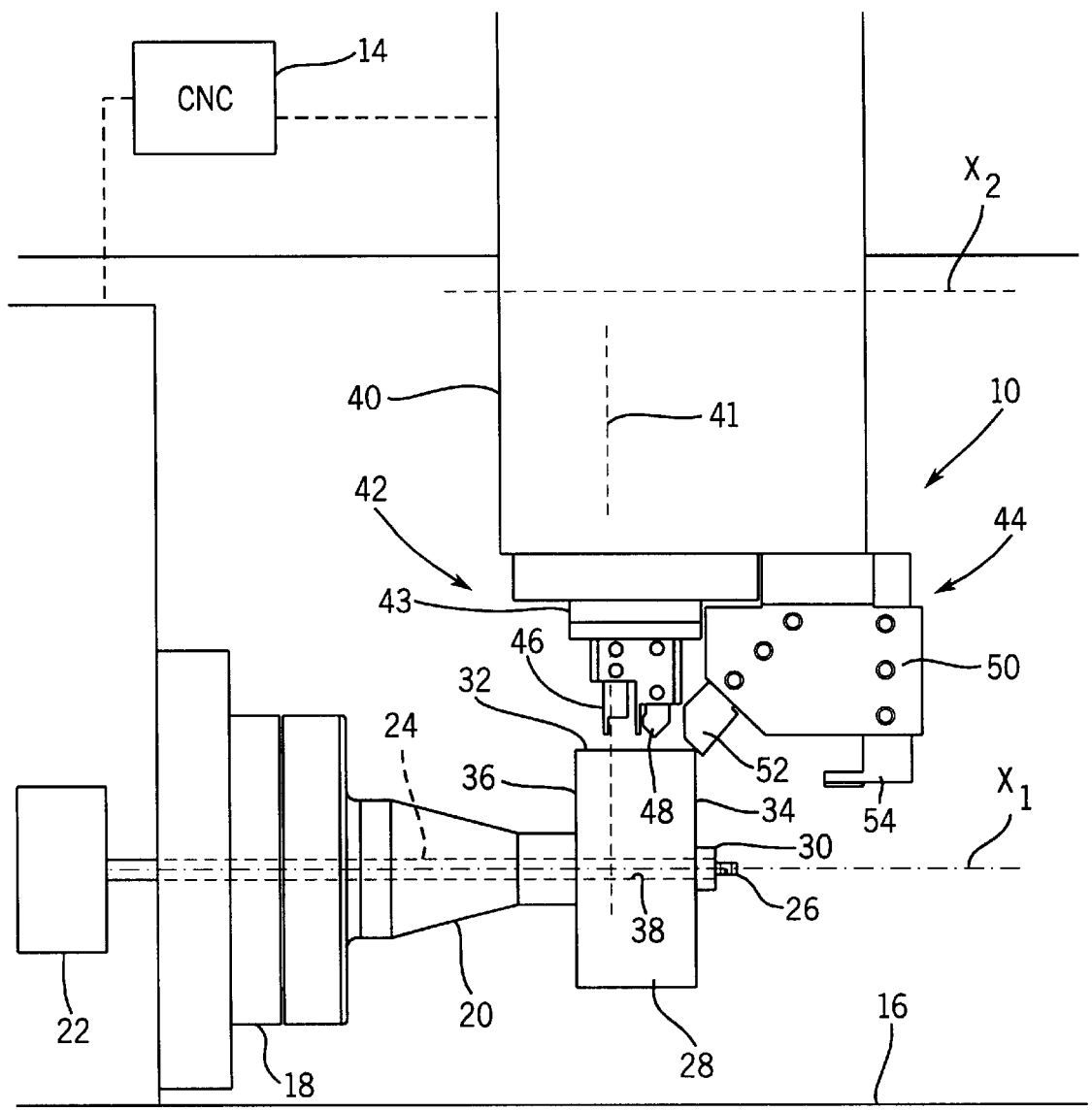
FIG. 1 is a front view of a machine tool for forming a sealing ring in accordance with the invention and showing a solid iron billet engageable with a rough turning tool.

Referring now to the drawings, the reference numeral 10 is used to designate a precision automated machine tool for forming sinusoidal shaped sealing rings 12 (FIG. 1A) in accordance with the invention. Preferably, the machine tool 10 is run by a programmed, computerized numerical control (CNC) 14 of which there are several well known designs, such as a TPS 3200 piston ring lathe. CNC machinery equipment enjoys the advantages of fast machine cycle times, consistent dimensional accuracy, flexibility of operation and case in programming to automatically machine a workpiece in a finished, machined product. Generally, the machine equipment has an enclosure or cabinet 16 which holds the various components of machine tool 10 and confines any metal dust or by-product during processing.

Figure 1A:
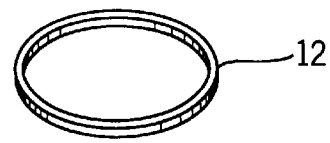
FIG. 1A is a perspective view of a sealing ring formed by the present invention.

Turning to FIG. 1, machine tool 10 includes a spindle structure 18 including an arbor 20 mounted for rotation about a first axial axis $x_1$. A hydraulic cylinder 22 is operably connected to the spindle structure 18 and has a rod 24 which is extendible and retractable along a longitudinal axis coincident with axis $x_1$. The rod 24 passes through the spindle structure 18 and the arbor 20 and defines a mounting surface for a workpiece 28, which is firmly retained in position against the arbor 20 by a nut 30 threaded upon the stud 26. It is a key feature of the invention that the workpiece 28 is provided in the form of a solid, iron, cylindrical billet having an outer diameter 32, a front face 34, a rear face 36 and a central hole 38 formed therein. Alternatively, the billet may be retained in place by a chuck or fixture.

The machine tool 10 also includes a slider arrangement, and in particular, a single slider 40 which is mounted for fore and aft movement along the second axial axis $x_2$ which is substantially parallel to axial axis $x_1$. The slider 40 is characterized by downwardly depending tool structure divided into a movable first portion 42 and a second portion 44 fixed adjacent thereto. The first portion 42 has a quill 43 which is extendable and able along a radial axis $y_1$ which is generally perpendicular to the axial axes $x_1$ and $x_2$, and carries a parting tool 46 and a finishing tool 48. The second portion 44 of the slider 40 has a bracket 50 for retaining a turning tool 52 and a trepamig (or face-grooving) tool 54. As will be better understood hereafter, the slider 40 functions to bring each of the tools into engagement with the outer periphery 32 and front face 34 of the rotating billet 28 in a manner which will expeditiously form a series of various-sized sealing rings 12. CNC 14 forms a control device suitably programmed with the desired parameters of the sealing rings for coordinating and synchronizing the movement of the spindle structure 18 and the slide 40.

According to the invention, the slider 40 relies upon trepanning tool 54 to form a cut $C_1$ along a horizontal axis at a depth substantially equal to the width of a desired sealing ring. The slide 40 further relies upon the parting tool 46 to form a cut $C_2$ along an axis perpendicular to the axial axis at a depth intersecting the cut $C_1$ of the trepanning tool 54 and slightly greater than the inner diameter of the desired sealing ring.

The process for manufacturing sealing rings 12 using the machine tool 10 described above, will now be set forth below.

Before the machine tool 10 is put to use, individual billets 28 are formed by sawing elongated iron cylindrical bars which are typically several feet in length into desired cylindrical segments. Each of the billets 28 is then preferably drilled to form a central hole 38 which will accommodate passage of the stud 26, and is then delivered for processing at machine tool 10 (or otherwise stored or stacked in inventory). Once the CNC 14 is satisfactorily programmed, an operator extends the rod 24 of hydraulic cylinder 22 along longitudinal axis $x_1$ and mounts a billet 28 on the stud 26 retaining the same thereon by screwing nut 30 on its threaded end. The cylinder rod 24 is then retracted so that the stud 26 and nut 30 are drawn toward the front face 34 of the billet 28 and the rear face 36 is brought up tightly against the arbor 20. This firmly positions the billet 28 against lateral movement, allowing only rotation of the billet 28 by the driven spindle 18 about axial axis $x_1$. The slider 40 is then laterally positioned along axial axis $x_2$ such that turning tool 52 is moved closely adjacent the upper, outer edge of billet 28. Rotation of the spindle 18 is initiated and the slide 40 is controlled by the CNC 14 such that the turning tool 52 traverses along the entire outer diameter 32 of billet 28 to enable rough cutting of the billet outer diameter 32. That is, the slide 40 is synchronized with the rotation of the spindle 18 according to the data programmed into the CNC 14.

Figure 2:
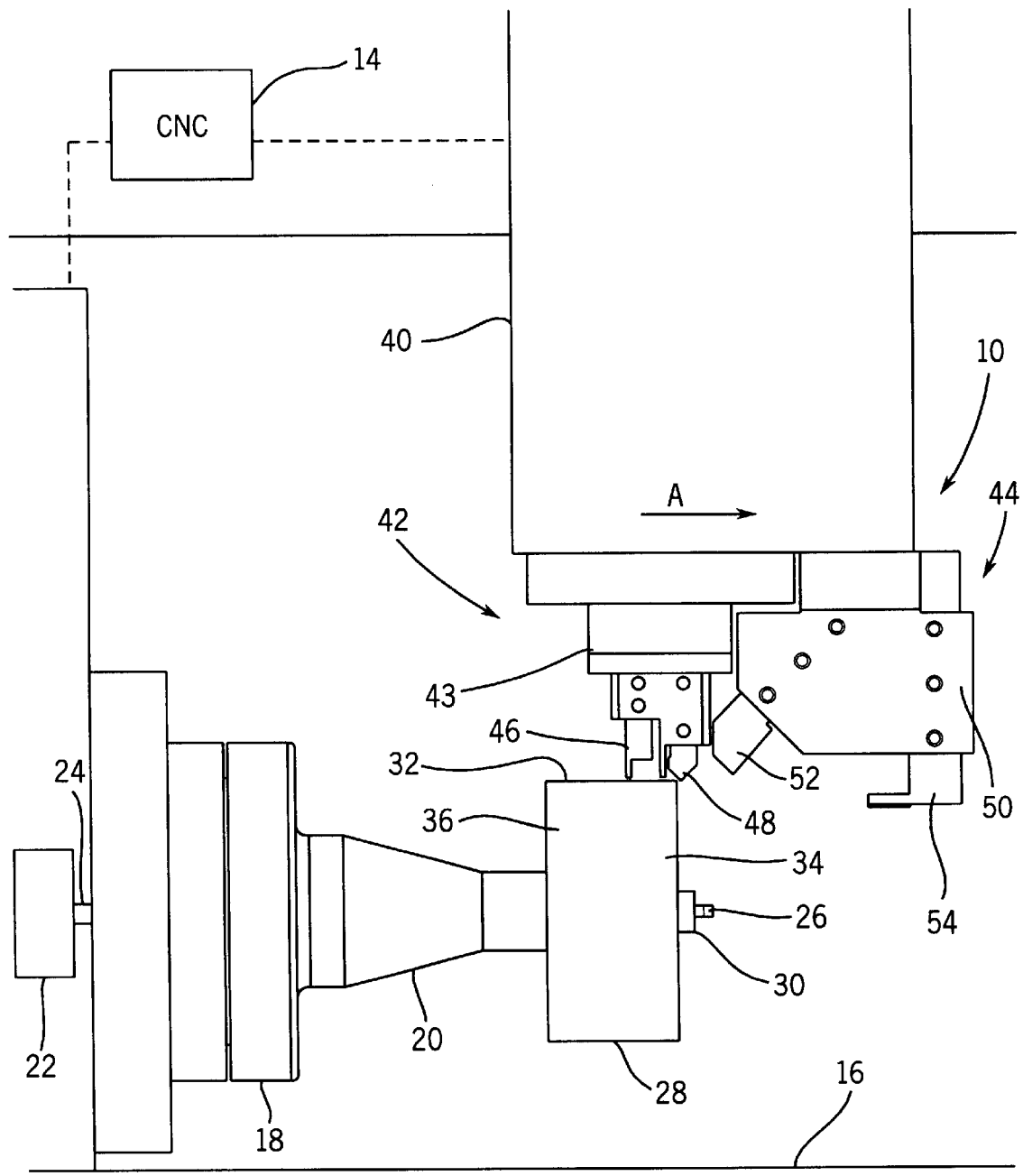
FIG. 2 is a view like FIG. 1 showing the billet engageable with a finish tool.

With this first machining step completed, the slide 40 moves along an axial axis $x_2$ in the direction of arrow A on FIG. 2 and, at the same time, the quill 43 is extended along radial axis $y_1$ such that the finishing tool 48 is positioned closely adjacent the upper, outer edge of billet 28. The movement of the quill 43 is synchronized with the rotation of the spindle 18 and the motion of the slide 40 to enable; the finishing tool 48 to traverse the outer diameter 32 of the billet 28.

Figure 3:
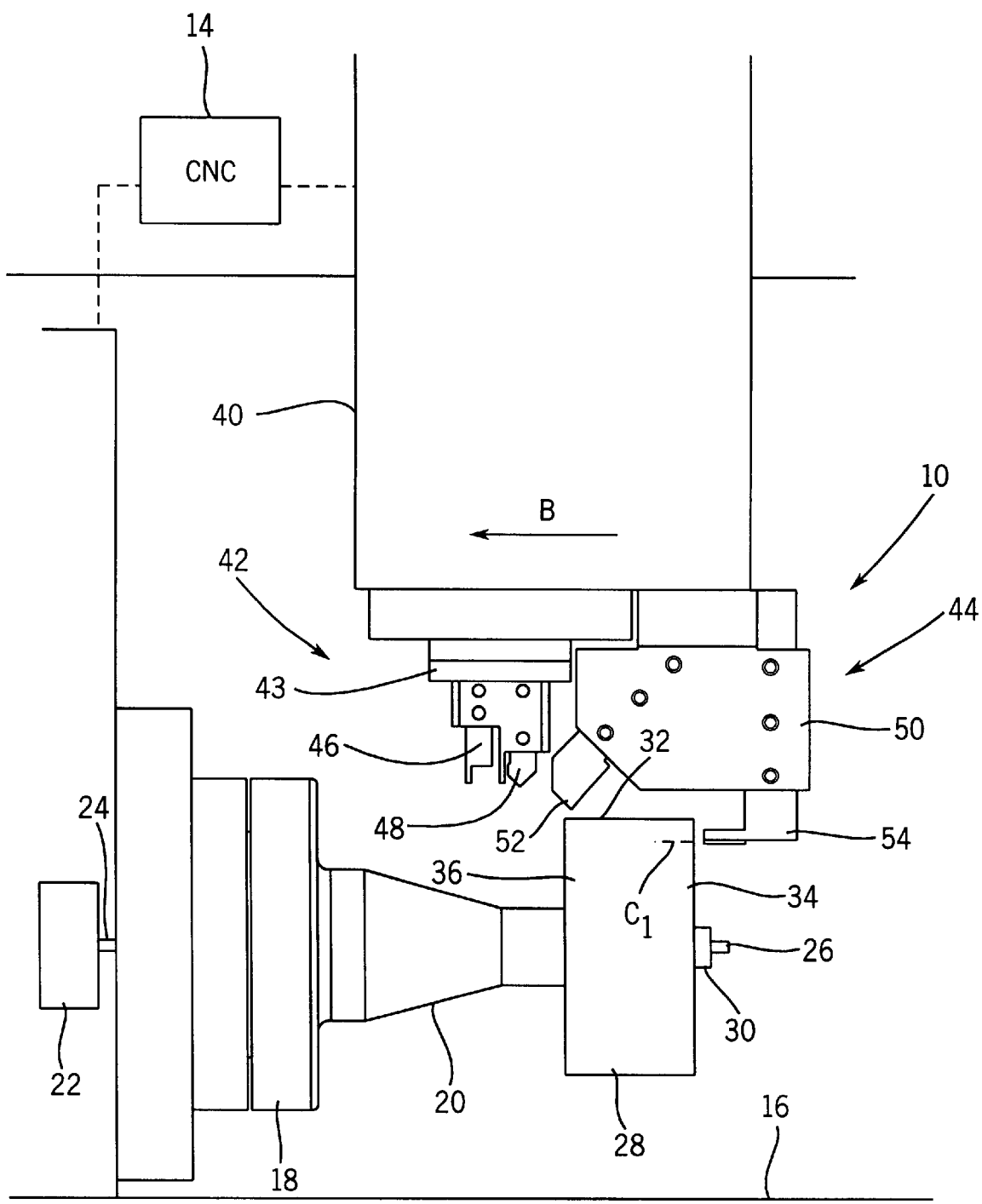
FIG. 3 is a view like FIG. 1 showing a trepanning tool plunged into the face of the billet to a depth approximately equal to the width of the desired sealing ring.

The machine tool 10 then operates sequentially to retract the quill 43 as the slide 40 is moved along the $x_2$ axial axis in the direction of arrow A in FIG. 3, whereby the trepanning or face-grooving tool 54 is positioned near the upper, outer edge of billet 28 and is plunged into the front face 34 of the billet 28 as the spindle 18 is rotated. This machining step has the effect of forming a cut $C_1$ at a depth substantially equal to the width of the desired sealing ring along its inner diameter. Once this depth is reached, the trepanning tool 54 is retracted from the billet 28 by opposite movement of the slide 40.

Figure 4:
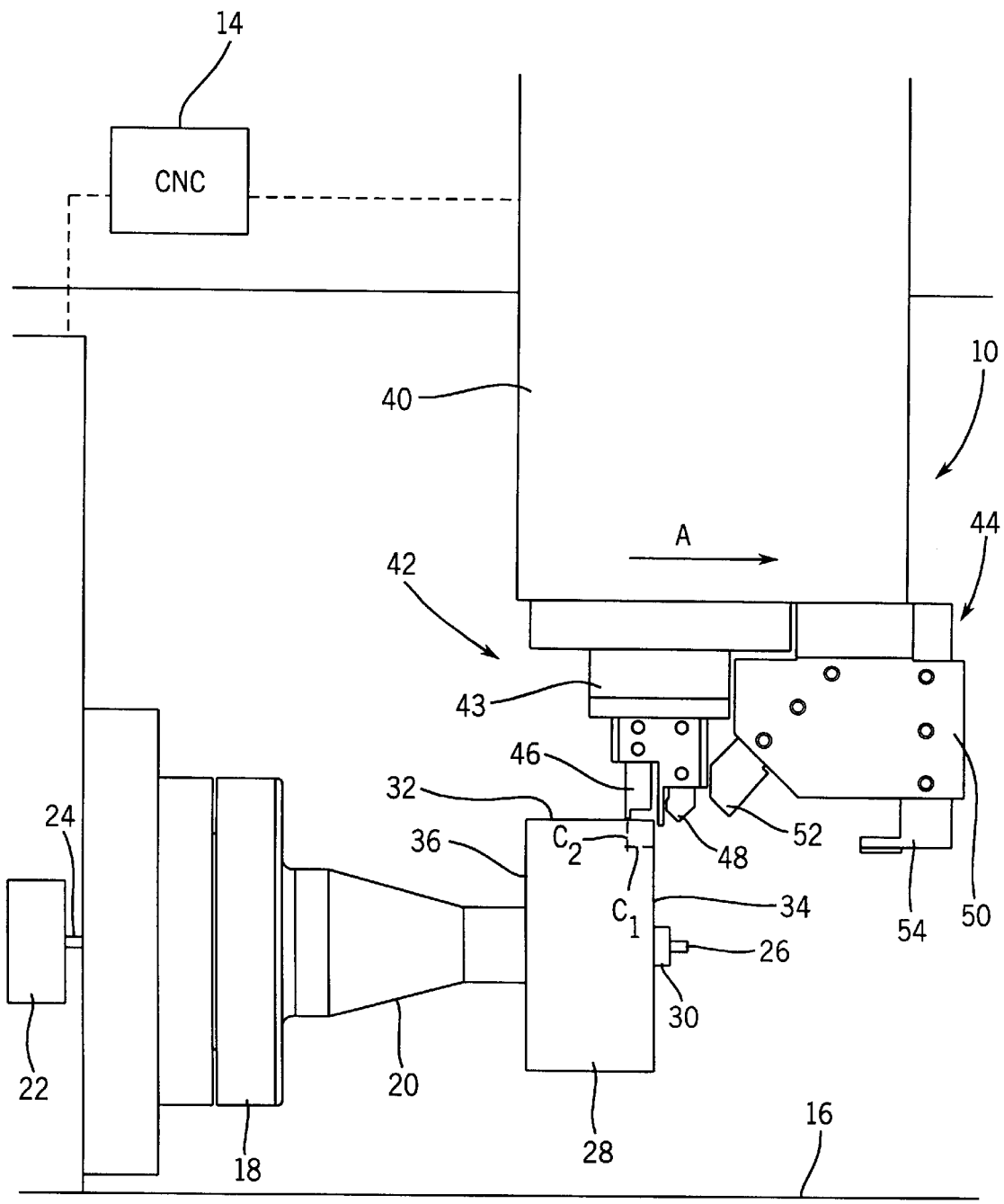
FIG. 4 is a view like FIG. 1 showing a parting tool plunged into the outer diameter of the billet to a depth slightly greater than the wall of the desired sealing ring.

Next, with reference to FIG. 4, the slide 40 is moved along axial axis $x_2$ in the direction of arrow A and, simultaneously, the quill 43 is extended along radial axis $y_1$ to position parting tool 46 closely adjacent the outer diameter 32 of billet 28. The further extension of quill 43 is coordinated with the rotation of the spindle 18 such that the parting tool 46 is plunged into the outer diameter 32 of the billet 28 to form a cut $C_2$ at a depth slightly greater than the inner diameter of the desired ring and intersecting the cut $C_1$ of the trepanning tool 54. Upon completion of this step, the parting tool 46 is retracted from the billet 28, the rotation of the spindle 18 is stopped, and a single sealing ring is produced which may be removed from the remainder of the billet 28 by manual or automatic means, such as with a blast of air.

The above steps may be repeated as many times as necessary to remove the desired number of sealing rings from the single billet 28. When sealing ring manufacture is finished, hydraulic cylinder rod 24 is extended, and nut 30 and the processed billet 28 are removed from the stud 26. The processed billet 28 is then retained as a smaller diameter core and, at a later date, can be retrieved to make further sealing rings of a progressively smaller diameter.

Once the formed rings 12 have been removed, the sides of the rings are ground to finish their width, the rings are slotted open and their joints are milled and interlocked for a purpose which is well known. As a final finishing step, the rings are deburred and protectively coated with zinc phosphate and oil.

It should be appreciated that the present invention provides a sealing ring manufacturing tool 10 and method wherein significant profit margins are realized with the raw iron billets which run a fraction of the cost of the products produced by prior art casting and tubing processes. The basic concept of restocking salvaged cores relies upon the fact that more smaller diameter rings are manufactured than larger diameter rings. The solid bar 28 is far easier to "chuck" or fix in the machine tool 10 and does not require any expensive tooling, jigs, or tail stocks, as previously required in the machining of tubular articles. The present invention allows for the machining of any size of sealing ring with a large reduction in set-up time. A computer program that generates required machine movements controls the entire machining process. The program generation is extremely efficient, usually under one minute. This new method effectively achieves zero set-up time, zero tooling cost, and a zero fixture cost manufacturing process and is effective on both small and large volume quantities.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. In a machine tool for performing machining of a cylindrical workpiece having an outer periphery and a face connected for rotation about an axis at the end of a driven spindle structure and having a slider arrangement for providing multiple tool engagement with the workpiece, and a control system for coordinating the movement of the spindle structure and the slider arrangement whereby the slider oscillates radially relative to the spindle, the improvement residing in:

a slider structure for having a first oscillating tool for forming the outer diameter of the workpiece to a sinusoidal shape, and having a second oscillating tool for plunging into the face of the workpiece to form a sinusoidal shaped cut at a depth substantially equal to the width of a sealing ring, and a third oscillating tool for plunging into the outer periphery of the workpiece to form a cut at a depth intersecting the cut of the second tool, thereby forming a sealing ring having a sinusoidal shape in a plane perpendicular to the axis of the workpiece.

2. The improvement of claim 1, wherein the workpiece is a solid cylindrical billet provided with a central hole formed therethrough and the spindle structure includes a hydraulic cylinder having an extendable and retractable rod provided with a threaded stud at one end thereof which passes through the hole in the billet and receives a nut thereon, the rod being selectively retracted to firmly retain the billet between the spindle structure and the nut for engagement with the first tool and the second tool.

3. In a method for machining a workpiece having an outer periphery and a face connected for rotation at the end of a driven spindle structure utilizing a slider arrangement for providing a multiple tool engagement with the workpiece and automatically coordinating the movement of the spindle structure and the slider arrangement, the improvement residing in:

(a) providing the workpiece in the form of a solid substantially cylindrical billet having a retaining structure formed therein;

(b) using at least one cutting tool to finish the outer periphery of the billet to a sinusoidal shape while the billet is attached to the spindle structure;

(c) using another tool to form a sinusoidal shaped cut in the face of the billet at a depth substantially equal to the width of the sealing ring; and (d) using yet another tool to form a sinusoidal shaped cut in the outer diameter of the billet at a depth intersecting the cut of the face cutting tool, thereby forming a sealing ring.

4. The method of claim 3, including the step of:

(e) removing the formed sealing ring from the billet.

5. The method of claim 4, and including the step of repeating steps (a) through (e) to remove the desired number of formed sealing rings from the billet.

6. The method of claim 5, including the step of:

(f) retaining the remaining billet.

7. The method of claim 6, including the step of:

(g) retrieving the billet and repeating steps (a) through (e) to form sealing rings of a smaller outer periphery.

8. A machine tool for forming sinusoidal shaped sealing rings from a solid cylindrical billet having an outer diameter, a face and a hole formed centrally therein, the machine tool comprising:

a spindle structure mounted for rotation about a first axial x-axis upon which the billet is removably attached;

a slider arrangement mounted for axial movement about a second axial x-axis parallel to the first axial axis and having a first portion and a second portion fixed adjacent thereto, the first portion being movably mounted along a radial axis generally perpendicular to the first and second axial axes and carrying a parting tool and a finishing tool, and the second portion carrying a turning tool and a trepan tool; and a control device coordinating the movement of the spindle structure and the slider arrangement along the axial and radial axes such that in sequence, the turning tool is engaged with the outer diameter of the billet to rough form a sinusoidal shape, the finishing tool is engaged with the outer diameter of the billet to finish a sinusoidal, the trepan tool is engaged with the face of the billet to form a sinusoidal shaped cut at a depth substantially equal to a width of the sealing ring, and the parting tool is engaged with the outer diameter of the billet to form a cut at a depth intersecting the cut of the trepan tool thereby forming a sinusoidal shaped sealing ring.

9. The machine tool of claim 8, wherein the spindle structure includes an arbor connected thereto.

10. The machine tool of claim 9, including a hydraulic cylinder having an extendible and retractable rod passing through the spindle structure, the arbor and the hole in the billet, and terminating in a stud upon which a nut is threaded.

11. The machine tool of claim 10, wherein the hydraulic cylinder rod is retractable to retain the billet between the arbor and the nut.

12. The machine tool of claim 1, wherein the first portion is comprised of a quill selectively extendible and retractable between the slider arrangement and the billet.

13. A method for manufacturing sinusoidal shaped sealing rings comprising the steps of:

(a) providing a solid cylindrical billet having an outer diameter, a face and a hole centrally formed therein;

(b) mounting spindle structure for rotation about a first axial axis, the spindle structure being provided with a movable rod having an end with a threaded stud;

(c) removably fastening the billet on the stud such that the billet will rotate with the spindle structure;

(d) mounting a slider arrangement for axial movement about a second axial axis substantially parallel to the first axial axis, the slider arrangement having a first portion and a second portion fixed adjacent thereto, the first portion being movably mounted along a radial axis substantially perpendicular to the first and second axial axes and carrying a parting tool and a finishing tool, and the second portion carrying a turning tool and a trepan tool; and (e) automatically controlling the movement of the spindle structure and the slider arrangement along the axial and radial axes such that, in the following sequence, the turning tool is traversed across the outer diameter of the billet to form a sinusoidal shape, the finishing tool is traversed across the outer diameter of the billet to finish the sinusoidal shape, the trepan tool is plunged into the face of the billet to form a sinusoidal shaped cut at a depth substantially equal to a width of the sealing ring; and the parting tool is plunged into the outer diameter of the billet to form a cut at a depth intersecting the cut of the trepan tool thereby forming a sinusoidal shaped sealing ring.

14. The method of claim 13, including the step of:

(f) removing the formed sinusoidal shaped sealing ring from the billet.

15. The method of claim 14, including the step of repeating steps (a) through (f) to remove the desired number of sealing rings from the billet.

16. The method of claim 15, including the step of:

(g) retaining the billet.

17. In a method for machining a workpiece having an outer periphery and a face connected for rotation at the end of a driven spindle structure utilizing a slider arrangement for providing a multiple tool engagement with the workpiece and automatically coordinating the movement of the spindle structure and the slider arrangement, the improvement residing in:

(a) providing the workpiece in the form of a solid, substantially cylindrical billet having a retaining structure formed therein;

(b) cutting the outer periphery of the billet to a sinusoidal shape while the billet is attached to the spindle structure;

(c) using a parting tool to form a sinusoidal shaped cut in the outer diameter of the billet; and (d) using a trepan tool to form a sinusoidal shaped cut in the face of the billet at a depth substantially equal to the width of the sealing ring and intersecting the cut of the parting tool thereby forming a sinusoidal shaped sealing ring.

* * * * *